United States Patent [19]

Keefauver

[11] Patent Number: 5,255,577
[45] Date of Patent: Oct. 26, 1993

[54] TIRE CHAIN TENSIONING

[76] Inventor: George L. Keefauver, 6480 Main Ave., Space 57, Orangevale, Calif. 95662

[21] Appl. No.: 864,214

[22] Filed: Apr. 6, 1992

[51] Int. Cl.$^5$ .................. B25B 27/22; B60C 27/06
[52] U.S. Cl. .................. 81/15.8; 152/213 R
[58] Field of Search .............. 152/213 R, 213 A, 217, 152/219, 241; 81/15.8; 254/199

[56] References Cited

U.S. PATENT DOCUMENTS

| | | | |
|---|---|---|---|
| 1,597,549 | 8/1926 | Siegel | 81/15.8 X |
| 1,674,691 | 6/1928 | Marsh | 152/213 R |
| 1,795,206 | 3/1931 | Frégeau | 152/217 |
| 1,974,833 | 9/1934 | Reyburn | 152/217 |
| 2,275,994 | 3/1942 | Ruhkala | 152/213 R |
| 2,316,718 | 4/1943 | Royer | 81/15.8 |
| 2,581,225 | 1/1952 | Anderson | 81/15.8 |
| 3,150,859 | 9/1964 | Payne | 81/15.8 X |
| 4,142,808 | 3/1979 | Müller et al. | 152/217 X |
| 4,182,392 | 1/1980 | Müller | 152/219 |
| 4,679,608 | 7/1987 | Jeindl | 81/15.8 X |

Primary Examiner—Michael W. Ball
Assistant Examiner—Francis J. Lorin
Attorney, Agent, or Firm—Bielen, Peterson & Lampe

[57] ABSTRACT

A tire chain tensioning device utilizing a first element which may be a hollow body. The first element engages a second element which is a hollow body having a chamber for accepting the first element. A spring is fixed to the first and second elements and lies within the first and the second elements while urging the first and second elements toward one another. A pair of catches connected to the first and second elements, respectively, are capable of engaging selective links of a tire chain loosely placed over a tire.

4 Claims, 1 Drawing Sheet

U.S. Patent    Oct. 26, 1993    5,255,577
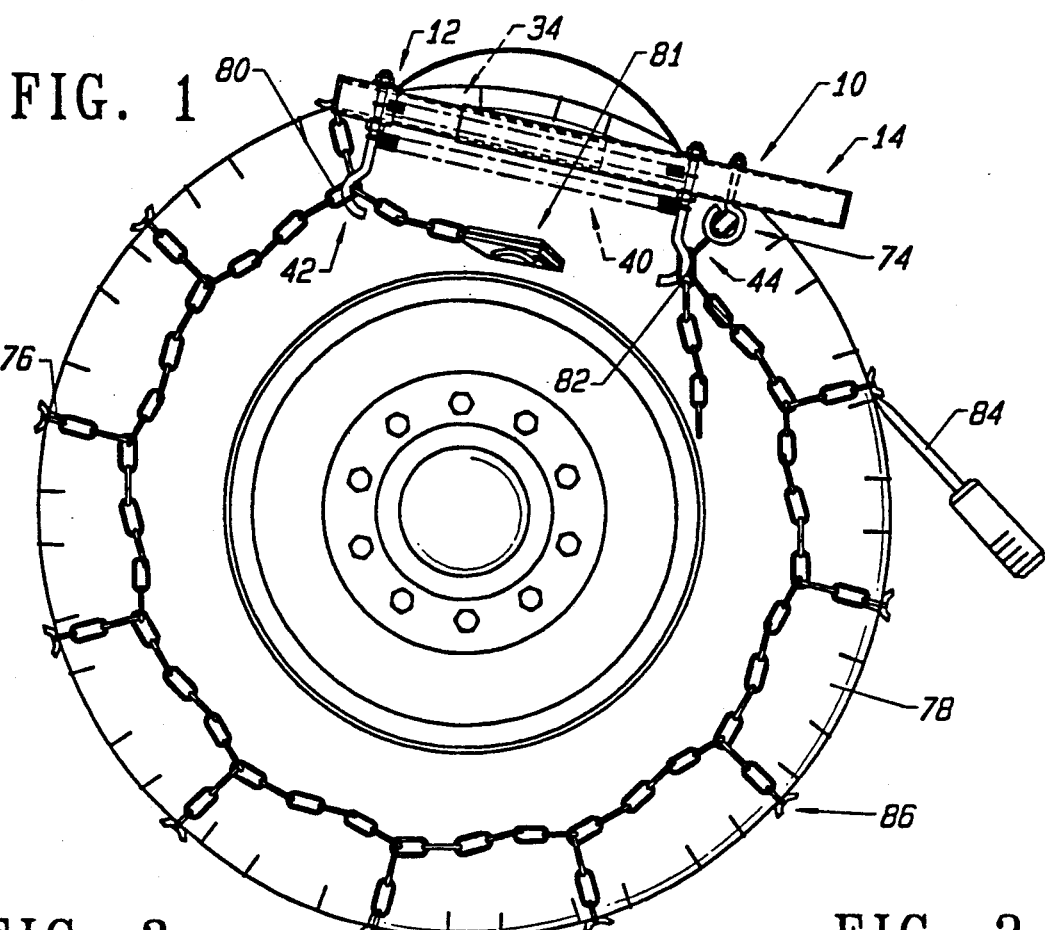
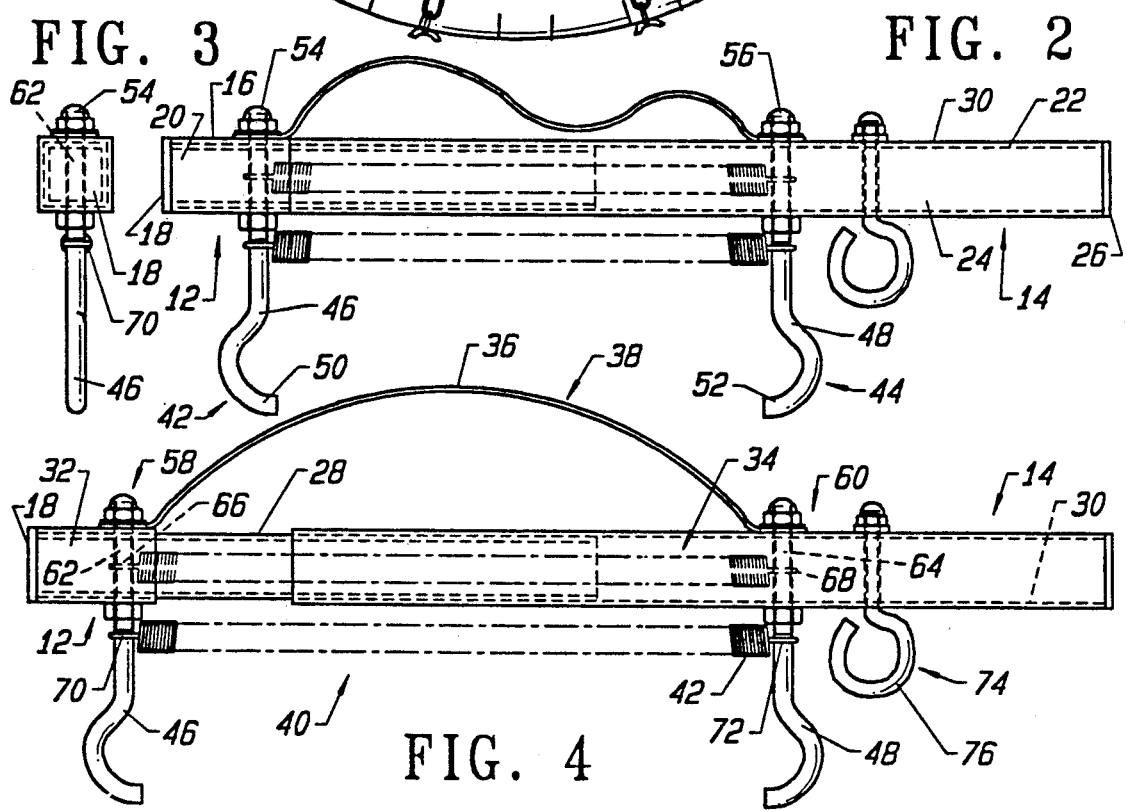

TIRE CHAIN TENSIONING

BACKGROUND OF THE INVENTION

The present invention relates to a novel tire chain tensioning device.

Traction or tire chains are commonly used on vehicles to provide purchase to a tire during slippery road conditions caused by snow, mud, ice, and the like. Tire chains are required by authorities in certain areas on trucks and may be employed for hundreds of miles of travel during the winter season. Consequently, tire chains must be properly installed and tightened in order to prevent breakage of the tire chain which can create a very dangerous situation.

Truck tires require particular care in the installation of tire chains since the centrifugal force at the perimeter of a truck tire is far greater than that of an automobile. The normal tire chains for truck tires are placed circumferentially about the same and include a number of cross-links which extend between circumferential links which lie at the side of the tires. The cross-links often engage the tread or lugs of a tire and must be loosened by hand while maintaining circumferential tension on the tire by the tire chain.

Various devices have been proposed to solve the problem of tightning tire chains on tires. For example, U.S. Pat. No. 3,585,883 describes a yoke-shaped chain tightner which utilizes a rigid guide member with a sliding member that pulls a U.S. Pat Nos. 2,068,887 and 2,431,709 show tensioning devices for tire chains which utilize springs connected to wires or cables which span he loose links of the tire chain. U.S. Pat. No. 1,072,252 employs a multiplicity of coil springs which apply tension to a loose tire chain. U.S. Pat No. 1,330,591 utilizes a pair of hooks or heads which are surrounded by a coil spring to tension a loose tire chain.

Unfortunately, the prior art devices do not apply a uniform tension and are susceptible to damage since the spring and cable mechanisms are exposed to the elements.

A device which solves the problems encountered in the prior art would be a great advance in the transportation industry.

SUMMARY OF THE INVENTION

The present invention relates to a novel tensioning device for a tire chain placed over a tire.

The device of the present invention utilizes a first element which is capable of traveling inside a hollow second element. In certain embodiments of the present invention, the second element may also be hollow and possess a chamber. The first and second elements may be constructed of material capable of withstanding abrasion forces. The movement of the first element relative to the second element may be in the form of a sliding engagement such that the second element acts as a guide for movement of the first element.

The tensioning device of the present invention also includes first and second catches or hooks connected to the first and second elements, respectively. The catches may be in the form of a termination of a post which extends into the chambers of the first and second elements and is fixed to the first and second elements. The catches would extend away from the sliding interaction of the first and second bodies and be capable of engaging the links of the tire chain while placed over the tire in loose configuration. Stop means may also be included to limit the travel of the first element away from the second element.

Spring means is also provided in the present invention to biase or urge the first element toward the second element. Conversely, separation of the first and second elements would be resisted by the spring means. The spring means would extend at least into the chamber of the second element and, in certain cases, into the chamber of the first element. Thus, the spring means is uniformly guided and protected from damage by the first and second elements. The posts of the first and second catches may serve as anchoring points for the spring means within the chambers of the first and second elements. Another spring means may be attached to the posts of the catches, but outside the confines of the chambers of first and second elements. Such second spring means would serve to increase the overall tension on the tire chain.

A further feature of the present invention is a gripping member which may be in the form of a ring which extends from the first member. Such gripping means allows the user to hook the first catch onto the tire chain, extend the first and second elements, and then engage the second catch to the tire chain without touching the catches.

It may be apparent that a novel and useful tensioning device for a tire chain has been described.

It is therefor an object of the present invention to provide a device for tightening or tensioning tire chains much that such chains may be used safely on roadways.

Another object of the present invention is to provide a tensioning device for tire chains which is usable with tire chains of varying sizes.

Yet another object of the present invention is to provide a tensioning device for tire chains which is sturdy and contains a minimum number of moving parts.

A further object of the present invention is to provide a tensioning device for tire chains which is simple to install and remove on a tire chain in place on a tire.

Another object of the present invention is to provide a tensioning device for a tire chain which may be simply repaired and maintained.

The invention possesses other objects and advantages especially as concerns particular characteristics and features thereof which will become apparent as the specification continues.

BRIEF DESCRIPTION OF THE DRAWINGS

FIG. 1 is a side elevational view of the tire having a tire chain loosely fitted thereover with the device of the present invention in place.

FIG. 2 is a side elevational view of the device of the present invention.

FIG. 3 is a left end view of the device of the present invention.

FIG. 4 is a side elevational view of the device of the present invention in an extended configuration.

For a better understanding of the invention reference is made to the following detailed description of the preferred embodiments thereof which should be referenced to the prior described drawings.

DESCRIPTION OF THE PREFERRED EMBODIMENTS

Various aspects of the invention will evolve from the following detailed description of the preferred embodiments thereof which should be taken in conjunction with the previously described drawings.

The invention as a whole is depicted in the drawings by reference character 10. The tensioning device 10 includes a first element 12 and a second element 14 that are movable relative to one another. In the embodiment shown in FIGS. 2 and 3, first element 12 is a hollow metallic body 16 having an end cap 18. Although first element 12 includes a chamber 20 in the preferred embodiment it should be realized first element 20 may be formed of solid stock. The second element 14 is depicted as a hollow metallic body 22 having a chamber 24 therewithin. Cap 26 encloses chamber 24 in the same manner as cap 18 of first element 12. First element 12 slidingly engages second element 14 in that outer wall 28 of first element 12 slides along inner wall 30 of second element 14, FIG. 4. Bushing 32 limits the travel of first element 12 toward second element 14.

First spring means 34 is in the form of a coil spring which lies within chambers 20 and 24 of first and second elements 12 and 14. First spring means 34 biases or urges first and second elements together. Thus, a force is created when first element 12 and second element 14 are urged apart. Line 36 serves as a portion of stop means 38 for limiting the extension between first and second element 12 and 14. As previously described, bushing 32 serves as stop means 38 for second element 14 in the opposite direction. Second spring means 40 external to chambers 20 and 24 is also shown in the present invention to create the tension force between first and second elements 12 and 14. Spring means 40 is reconstructed in form of a coil spring 41, FIGS. 2 and 4.

Referring again to FIGS. 2-4, first catch 42 and second catch 44 extend from first and second elements 12 and 14, respectively. First and second catches 42 and 44 are in the form of elongated members 46 and 48 each having hooks or loops 50 and 52 at one terminus thereof. Elongated members 46 and 48 pass through chambers 20 and 24 and form termini 54 and 56 via exterior of first and second elements 12 and 14, respectively. Pairs of nuts 58 and 60 hold elongated members 46 and 48 to first and second elements 12 and 14, respectively. Threaded portions 62 and 64 of elongated members 46 and 48 also serve as anchoring points 66 and 68 for first spring means 34. Outside chambers 20 and 26, elongated members 46 and 48 also function as anchoring points 70 and 72 for second spring means 40. Gripping element 74, FIGS. 2 and 4, permits the user to grasp second member 14 while slipping a finger through the ring portion 76 of gripping element 74, to extend first and second elements of device 10 with one hand.

In operation, FIG. 1, device 10 is employed with a tire chain 76 which is loosely fitted around tire 78. First catch 42 engages link 80 of tire chain 76 which is near the fastening mechanism 81. The user then pulls device 10 by grasping second member 14 with a finger extended through gripping element 74. Second element 14 extends relative to first element 12 against the force of spring means 34 and/or spring means 40. Catch 44 then engages link 82 and device 10 is released. The user subsequently employs a prying tool such as screwdriver 84 to loosen plurality of cross-links 86 of tire chain 76. Such cross-links have a tendency to engage the lugs of the tread of tire 78, in this regard. At this point, device 10 will automatically 10 tension the tire chain 16 between links 80 and 82 as the cross links 84 are loosened. Fastening mechanism 81 is then pulled toward link 82 and latched onto the link of tire chain 76 furthest from link 80 thereof. Device 10 is then removed for reuse as needed.

While in the foregoing embodiments of the invention have been set forth in considerable detail for the purposes of making a complete disclosure of the invention it may be apparent to those of skill in the art that numerous changes may be made is such detail without departing from the spirit and principles of the invention.

What is claimed is:

1. A tire chain tensioning device, comprising:
   a. a first hollow elongate element;
   b. a second hollow elongate element, said first element being movable relative to and extending into said second element;
   c. a first catch connected to said first element, wherein said first catch includes a hook extending laterally through a distal end of the first element for engaging a first selected link of a tire chain;
   d. a second catch connected to said second element, wherein said second catch includes a hook extending laterally through an end of the second element for engaging a second selected link of a tire chain;
   e. spring means urging said first element toward said second element, said spring means being fixed to portions of said first and second catches and located inside said first and second elements;
   f. a stop means to limit the extension of said first and second elements apart from each other; and,
   g. a gripping handle extending from a distal end of the second element.

2. The tensioning device of claim 1 further including second spring means spanning said first and second catches external to said first and second elements.

3. The tensioning device of claim 1 in which said stop means includes a line connected to said first and second elements.

4. The tensioning device of claim 1 in which a second spring means is removably fastened to said first and second elements.

* * * * *